T. R. COLE.
EGG TESTER.
APPLICATION FILED JAN. 18, 1910.

983,687.

Patented Feb. 7, 1911.

2 SHEETS—SHEET 1.

Witnesses
William Smith
John M. Dunegan

Inventor
Thomas R. Cole
By Victor J. Evans
Attorney

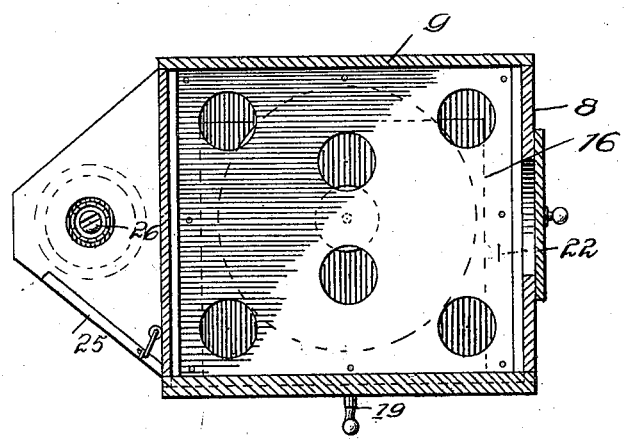
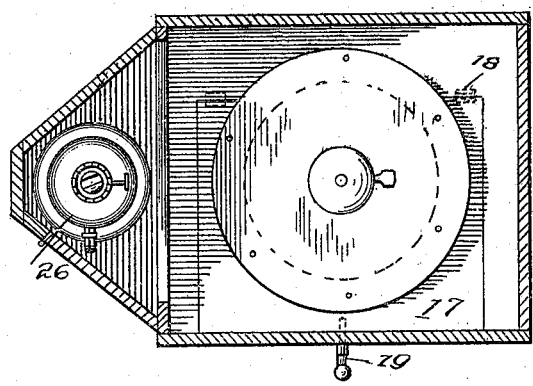

UNITED STATES PATENT OFFICE.

THOMAS R. COLE, OF BUXTON, IOWA.

EGG-TESTER.

983,687.

Specification of Letters Patent.

Patented Feb. 7, 1911.

Application filed January 18, 1910. Serial No. 538,687.

*To all whom it may concern:*

Be it known that I, THOMAS R. COLE, a citizen of the United States, residing at Buxton, in the county of Monroe and State of Iowa, have invented new and useful Improvements in Egg-Testers, of which the following is a specification.

This invention relates to improvements in egg testers and has for its object the provision of a device of that kind wherein a number of eggs may be placed and their condition readily determined.

Another object is the provision of an egg tester wherein the light may be given from an incandescent lamp or when it is impossible to use electricity, the light may be supplied by an ordinary oil lamp.

Another object is the provision of a bottom provided with a hinged door, the inner surface of which is provided with a reflector and the reflector and door being provided with alining openings for the reception of an incandescent lamp, the said door being detachably secured in the bottom whereby it may be readily opened and the lamp globe and reflector cleaned.

A further object is the provision of a tester provided with an opening having a pivoted closure, the said closure being so positioned that it may be readily moved and the hand of the operator inserted through the opening whereby the undesired eggs may be marked before removing from the tester.

With these and other objects in view, which will more fully hereinafter appear, the present invention consists in certain novel details of construction and arrangement of parts, hereinafter fully described, illustrated in the accompanying drawings and more particularly pointed out in the appended claim, it being understood that various changes in the form, proportion, size, and minor details of the device may be made within the scope of the appended claim without departing from the spirit or sacrificing any of the advantages of the invention.

Figure 1:
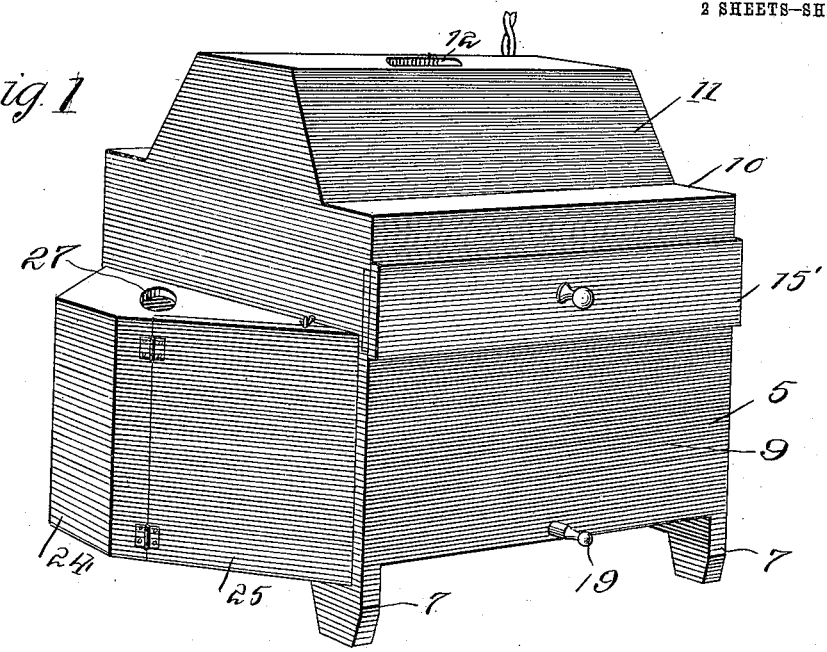
Figure 2:
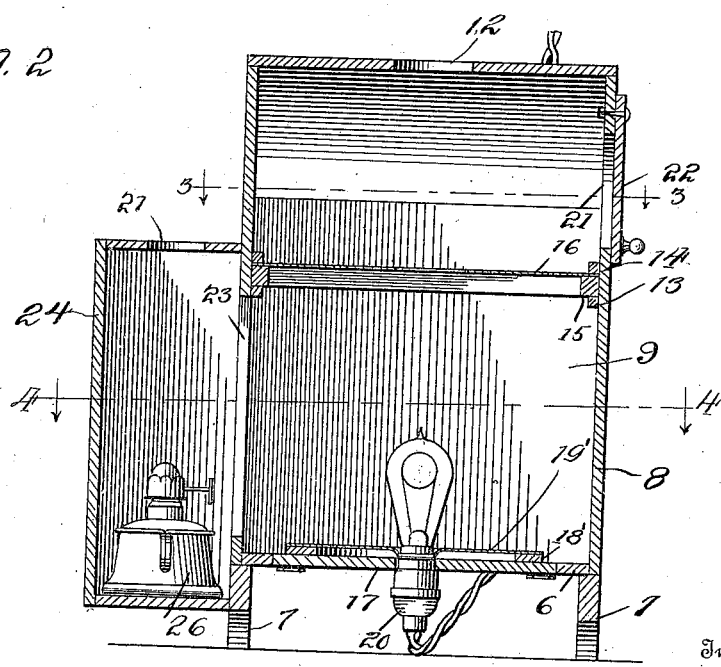

In the accompanying drawings, forming a part of the specification:—Figure 1 is a perspective view of the device. Fig. 2 is a vertical sectional view of the same. Fig. 3 is a sectional, plan view, approximately on the line 3—3 of Fig. 2. Fig. 4 is a similar view, approximately on the line 4—4 of Fig. 2.

Similar numerals of reference are employed to designate corresponding parts throughout.

The device comprises a casing, designated in general by the numeral 5. The casing includes, in its construction, a bottom 6 which is supported above the floor by a plurality of supporting legs 7 arranged at the four corners of the bottom. Rising from the opposite ends and sides of the bottom 6 are the end walls 8 and side walls 9.

The top is designated by the numeral 10 and is provided with a hood 11. The opposite side walls of the hood are inclined and the top of the hood is provided with a peep opening 12.

The front wall 9 has, adjacent to its upper end a transverse opening to receive the egg holding tray. The tray includes a frame 15, the opposite sides of which slide between guide strips 13 and 14 arranged on the opposed inner faces of the end walls 8. The frame 15 is covered with a screen 16 having a plurality of spaced circular openings of a size to snugly receive the eggs to be examined. The front of the frame is provided with a front wall 15' of a size to completely seal the opening through which the tray extends, as clearly shown in Fig. 1.

The bottom 6 is provided with a rectangular opening in which is arranged a correspondingly shaped door 17. The door 17 is hingedly united to the bottom, as shown at 18 in Fig. 4 and is secured within the opening by means of a pin 19 which extends to an opening formed in the lower end of the front wall 9, the said opening alining with the opening formed in the free side of the door.

Secured to the inner face of the door 17 are a pair of strips 18' arranged adjacent the opposite sides of the door and fixedly secured to these strips is a reflector 19'. The reflector is centrally provided with an opening which alines with an opening formed in the door 17, these alining openings receiving the socket 20 of an incandescent lamp, as clearly shown in Fig. 2.

Formed in one of the end walls 8 and between the frame 15 and upper end of the hood 11 is an opening 21 and pivoted to the outer face of the said end wall 8 is a closure plate 22 of a size to completely seal the opening 21. The opening 21 is of a size to receive the arm of the operator so that during the operation of testing the eggs and when it is desired to mark an undesirable egg, the operator may, without removing his head from the opening 12 push the closure 22 aside and insert his arm through the opening 21 whereby the desired egg or eggs may be marked.

By reference now to Fig. 1, it will be seen that the end wall of the casing opposite to the wall in which the opening 21 is formed is provided with an enlarged opening 23 located between the frame 15 and bottom 6. Surrounding the opening 23 is a housing 24, one side of which is provided with a hinged door 25. The housing 24 contains a lamp or lantern 26 which, when it is impossible to use an electric light, will furnish sufficient light to permit the eggs to be inspected. The upper end of the housing 24 is provided with an opening 27 for the lamp chimney.

From the foregoing it is evident I have provided a device which is comparatively simple in structure and inexpensive to manufacture, embodying few parts to be so arranged that the danger of derangement will be reduced to a minimum. It will be further observed that in a device of this kind a great number of eggs may be placed in the openings of the screen and be inspected, whereby the time usually employed to inspect a large quantity of eggs will be reduced to a minimum.

Having thus described the invention, what is claimed, is:—

In an egg tester, a casing provided at its upper end with a hood having a peep opening, a frame slidingly fitted in said casing and provided with a perforated egg-holding screen one of the end walls of said case being provided at a point between the frame and hood with an opening, and a pivoted closure for said opening, the opposite end wall of said casing being provided below the frame with an opening, and a housing surrounding said opening and having a pivoted door, a bottom located at the lower end of the casing and having a central opening, a pivoted door arranged in said opening, means extending through openings in one side of the casing and door and serving to secure the door in a plane with the bottom, a reflector arranged on the inner face of said door, and a lamp secured in central openings formed in the door and reflector.

In testimony whereof I affix my signature in presence of two witnesses.

THOMAS R. COLE.

Witnesses:
B. P. CASTNER,
R. T. MASON.